US007686207B1

(12) United States Patent
Jeffs

(10) Patent No.: US 7,686,207 B1
(45) Date of Patent: Mar. 30, 2010

(54) LOCKING DEVICES FOR STORAGE BOXES SUCH AS MAILBOXES

(76) Inventor: John T. Jeffs, 20594 Ottawa Rd., Apple Valley, CA (US) 92308

( * ) Notice: Subject to any disclaimer, the term of this patent is extended or adjusted under 35 U.S.C. 154(b) by 0 days.

(21) Appl. No.: 12/326,735

(22) Filed: Dec. 2, 2008

(51) Int. Cl.
*B65G 11/04* (2006.01)

(52) U.S. Cl. .............................. 232/45; 292/56; 70/162

(58) Field of Classification Search .................. 232/45, 232/44, 17; 70/63, 141, 160–162; 312/219; 292/119–120, 127–128, 30–31, 11, 56
See application file for complete search history.

(56) References Cited

U.S. PATENT DOCUMENTS 1,538,871 A 5/1925 Krick
2,459,839 A 1/1949 Richards
2,793,927 A 5/1957 Reitzel
3,596,952 A 8/1971 Hinkle et al.
3,776,007 A 12/1973 Himsl
3,813,029 A 5/1974 Ostrom
3,834,780 A 9/1974 McClellan et al.
4,538,844 A 9/1985 Watanabe
4,609,233 A 9/1986 Walla
4,784,414 A 11/1988 Free
5,385,039 A 1/1995 Feldpausch et al.
5,407,126 A * 4/1995 Coultas et al. ................ 232/17
5,794,844 A 8/1998 Jenkins
5,845,843 A 12/1998 Kuller
6,318,628 B1 * 11/2001 Pangburn ..................... 232/17
6,378,916 B1 4/2002 Huang
6,412,688 B1 * 7/2002 Tucker et al. ................. 232/45
6,540,268 B2 4/2003 Pauser
6,669,243 B2 12/2003 Katoh et al.
6,688,656 B1 2/2004 Becken
6,698,258 B2 3/2004 Westwinkel
6,889,894 B2 5/2005 Yong
7,080,531 B2 7/2006 Vitry et al.
7,178,716 B2 2/2007 Yong

FOREIGN PATENT DOCUMENTS

EP 0 278 704 A2 8/1988
FR 2 646 199 10/1990

* cited by examiner

*Primary Examiner*—William L. Miller
(74) *Attorney, Agent, or Firm*—Knobbe, Martens, Olson & Bear, LLP

(57) ABSTRACT

A multipoint locking mechanism for an enclosure such as a mailbox which is gravity biased into an unlocked position. The locking mechanism includes a cylindrical lock member that extends through the panel and engages with a multipoint locking member that is rotatable about an axis that extends substantially the width of the panel. The rotatable locking member includes a plurality of hook members that engage with receiving openings formed on the door and further includes an engagement member that engages with the cylindrical member so that the cylindrical member can urge the engagement member and thus the rotatable member into a locked configuration. By manipulating the cylindrical lock member into an unlocked configuration, the engagement member is gravitationally biased to rotate so that the hook members are removed from the engagement member on the door thereby unlocking the door.

17 Claims, 5 Drawing Sheets

LOCKING DEVICES FOR STORAGE BOXES SUCH AS MAILBOXES

BACKGROUND OF THE INVENTION

1. Field of the Invention

The present invention relates to storage boxes, such as mailboxes, and, in particular, concerns a storage box with a simplified locking mechanism that is gravity and potentially spring biased into the unlocked position in certain applications.

2. Description of the Related Art

Storage boxes, such as mailboxes, are fairly ubiquitous devices in everyday world. Generally, mailboxes such as those used in post offices or in commercial buildings comprise at least a partially enclosed box with an access door or panel that allows the owner of the mailbox to selectively access the interior of the mailbox to pick up their mail. These types of mailboxes can range in size from 3"×4" to much larger enclosures that are 1'×1' or even greater.

It is desirable to be able to lock the access door to prevent unauthorized people from accessing and stealing the contents of the mailbox. Generally, the lock mechanism that is used in such mailboxes is relatively unsophisticated. Typically, it comprises a cylindrical lock body that extends through the door and is rotatable between a locked and unlocked position. A latch member is attached to the cylindrical lock body so as to be rotatable therewith so that the latch member engages with an interior wall of the mailbox in the locked position and is rotated away from engagement with the interior wall in an unlocked position. The lock is attached to the door in a number of known ways including by bolts, nuts, springs, clips, etc.

The previously described lock mechanism is relatively effective at providing some level of security for the mailbox. However, for larger mailboxes with larger access openings, this type of lock mechanism is more problematic. Specifically, the lock mechanism is only locking the door to the enclosure at a single point. Generally, mailboxes are made out of material such as sheet metal or aluminum and the like which can be easy to bend. For example, one common way to gain unauthorized access to the interior of a mailbox is to insert a screwdriver or crowbar into a corner of the mailbox door that is located away from the lock member. The door can then be bent or the lock cam or member can be broken through the force of the crowbar or screwdriver so that access to the interior of the mailbox can be obtained.

While it is well known to have multipoint locks to secure access doors and openings to enclosures, the typical multipoint lock is not readily adaptable for such things as mailboxes. Specifically, mailboxes are generally designed to be as inexpensive as possible. Further, there are also space and weight constraints that limit the amount of hardware that can be positioned inside of the mailbox. As a consequence, the typical multipoint lock which has members that extend off of the rotating shaft and connect with the frame at the sidewalls of the opening are generally too expensive, too weighty or too complex to be implemented successfully in mailbox applications. Further, mailboxes are generally going to be opened and closed a considerable amount of time as compared to many other enclosures and the continuous use of the mailbox may result in the more complex multipoint locking systems failing. Further, the contents of mailboxes can also be wedged up against the multipoint lock system so that the system may be jammed or otherwise prevented from operating correctly.

Based upon the foregoing, it will be appreciated that there is a need for a more reliable inexpensive multipoint lock system for storage enclosures, such as mailboxes. To this end, there is a need for a simple locking device that is reliable and easy to manipulate.

SUMMARY OF THE INVENTION

The aforementioned needs are satisfied, in one embodiment, by a locking assembly that includes a multipoint latch member that is attached to an access opening of an enclosure. The multipoint latch member defines a plurality of capture members that are spaced along a surface of the access opening. The multipoint latch member preferably is movable between a latched position and an unlatched position. The assembly further comprises a lock member that engages with the multipoint latch member so as to allow the user to move the latch member between the latched and unlatched orientations. The latch member is preferably pivotable between the latched and unlatched configuration and is further configured so as to be biased into the unlatched position. In one implementation the biasing is by gravity, in another implementation it is by spring and in yet another implementation it is by both gravity and spring. The assembly also preferably includes at least one receiving member that defines openings that receive the capture members on the multipoint latch member. Preferably, the at least one receiving member is coupled to a wall of the enclosure so that when the lock member is in the locked orientation thereby inducing latch member into the latched orientation, the access panel is inhibited from moving with respect to the rest of the enclosure.

Since the capture members engage the at least one receiving member along the length of the access panel the panel is thus secured along its length from unauthorized entry. Further, since the multipoint latch member is gravitationally biased into the unlatched position, the risk of the locking assembly being jammed or malfunctioning is reduced. These and other objects and advantages of the present invention will become more apparent from the following description taken in conjunction with accompanying drawings.

BRIEF DESCRIPTION OF THE DRAWINGS

Reference will now be made to the drawings wherein like numerals refer to like parts throughout.

DETAILED DESCRIPTION OF THE PREFERRED EMBODIMENT

Figure 1:
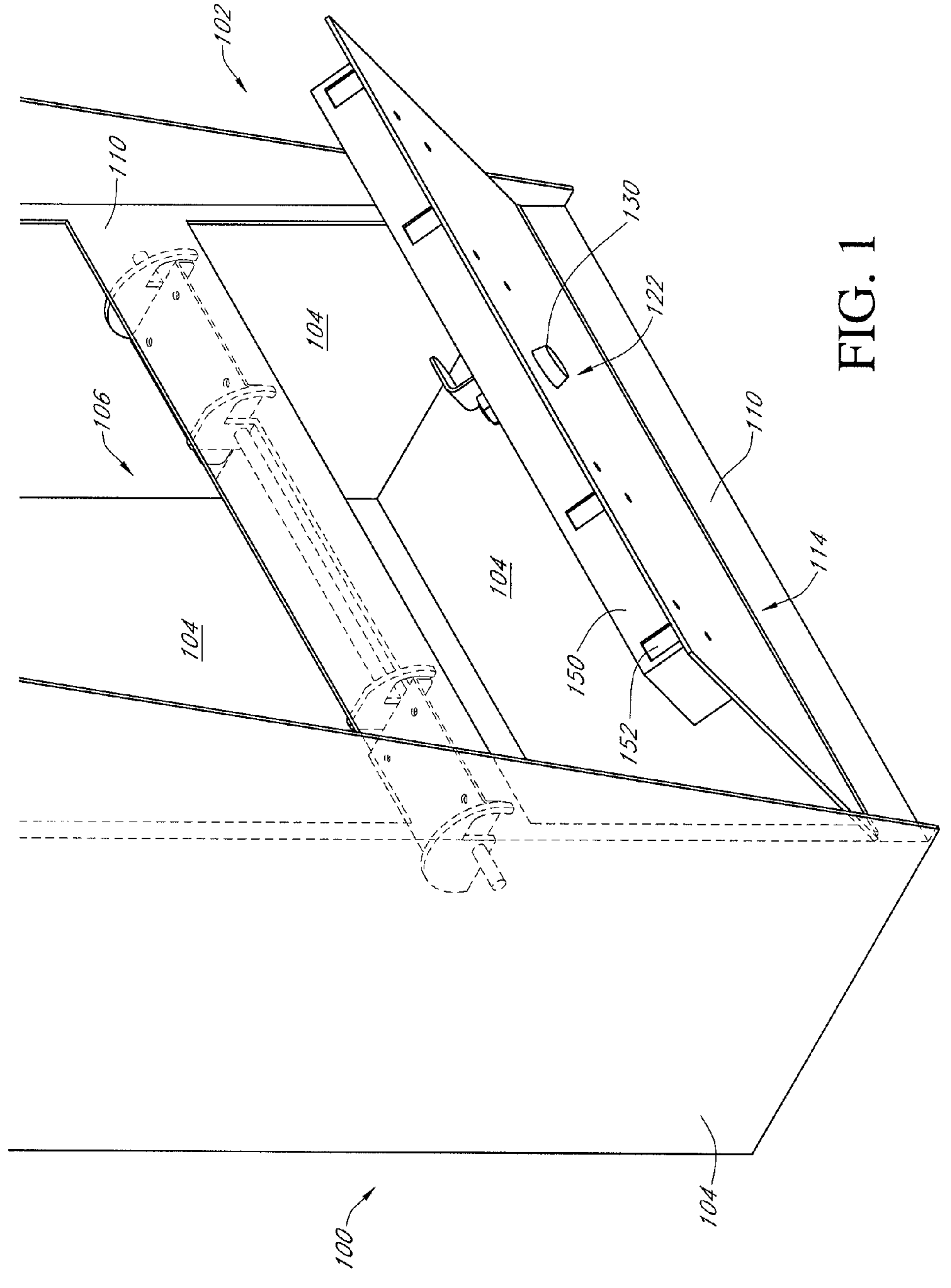
FIG. 1 is a perspective view of a mailbox incorporating a multipoint lock system of the present invention.

Reference will now be made wherein in like numeral refer to like parts throughout. Referring initially to FIG. 1, a storage enclosure, such as a mailbox 100 with a multipoint lock system 102 is shown. As shown, the mailbox 100 has a plurality of walls 104 that define an at least partially enclosed space 106 in which objects, such as mail and the like, can be stored. The mailbox 100 also defines a front surface 110 where an access panel or door 112 is hingeably mounted. As shown in FIG. 1, the access panel 112 is hingeably mounted to the front wall 110 of the mailbox 100 along a bottom edge 114 of the access panel 112 so that the access panel pivots about the bottom edge 114. In this way, the access panel 112 is generally biased by gravity to fall into an open position. While the description contained herein discloses the access panel 112 being hingably mounted to a bottom wall, it will be appreciated that the access panel can be attached to sidewalls or even the top wall without departing from the spirit of the present invention.

Figure 2:
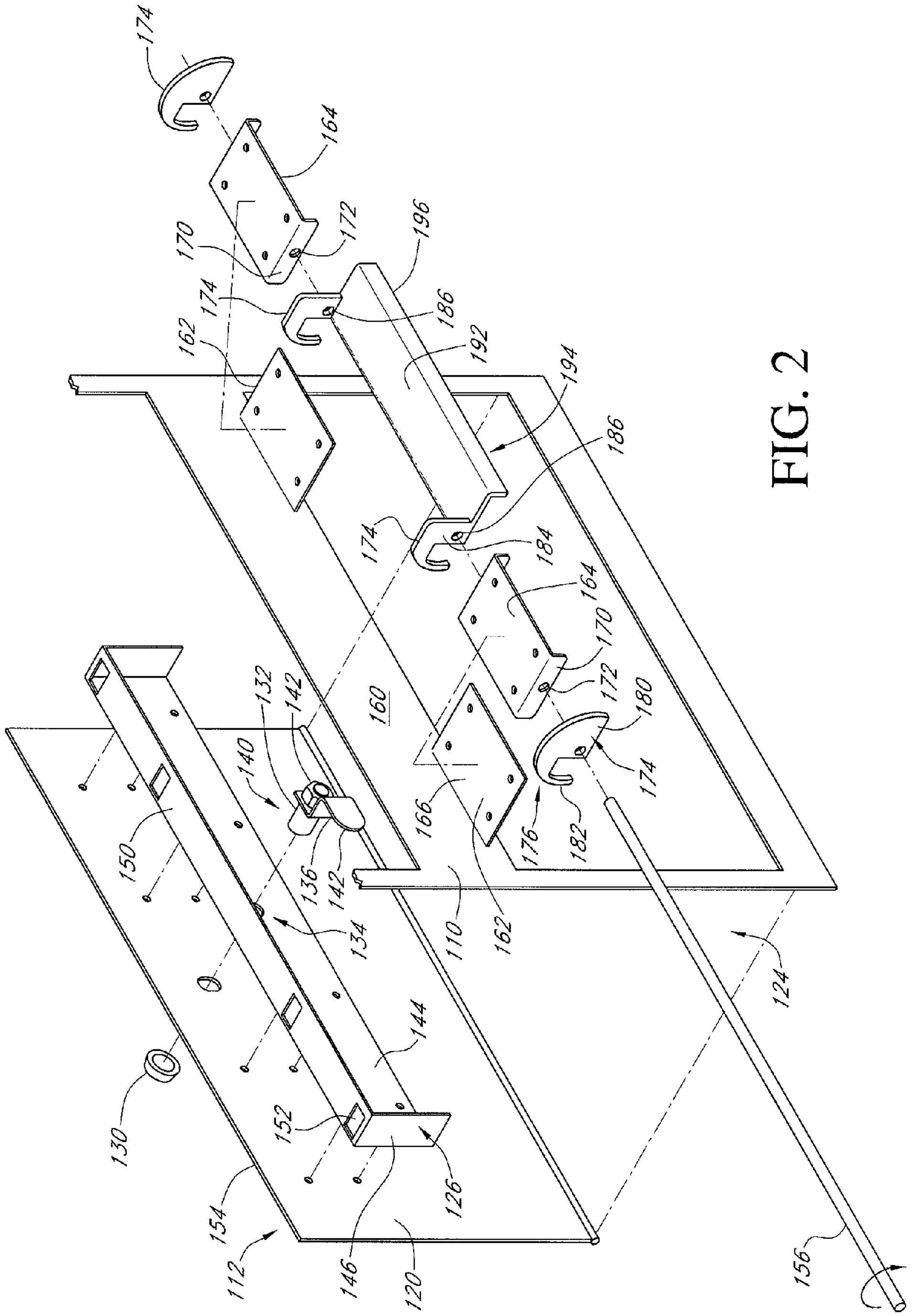
FIG. 2 is an exploded perspective view of the mailbox and multipoint lock system of FIG. 1.

As is also illustrated in FIG. 1, the access panel 112 has an outer surface 116 and an inner surface 120 (FIG. 2). As shown in FIG. 1, the multipoint lock system 102 includes three basic components: a cylindrical lock mechanism 122, a multipoint latch member 124, and a multipoint receiving member 126.

Referring now to both FIGS. 1 and 2, the various components of the locking system 102 will be described in greater detail. As shown in FIGS. 1 and 2, the cylindrical lock member 122 includes a front face 130 that is mounted on or through the outer surface 116 of the access panel 106 generally adjacent an edge of the access panel. The front face 130 is preferably adapted to receive a key in a well-known manner. Mounted adjacent the inner surface 120 of the access panel 112 also generally adjacent an edge, is a rotatable cylindrical member 132. The rotatable cylindrical member 132 is preferably rotatable in response to rotation of a key in the front face 130 of the cylindrical lock member 122 in a manner that is well-known in the art. As is also shown in FIG. 2, the multipoint receiving member 126 is also mounted on the inner surface 120 of the access door panel 112 and an aperture 134 is provided so that the rotatable cylindrical member 132 can extend through the aperture into the interior space 106 of the mailbox 100. The multipoint receiving member 126 is mounted via riveting, welds, fasteners or any other means known in the art.

An engagement member 136 is mounted on a distal end 140 of the rotatable member 132 via a bolt 141. The engagement member 136 in this implementation has a generally Z-shaped cross section, however, it will be appreciated from the following discussion that the engagement member 136 extends radially outward from the rotatable cylindrical member 132 so as to engage with the multipoint latch member 124 in the manner that will be described in greater detail below. The Z-shaped cross section of the engagement member 136 allows the outer end 142 of the engagement member 136 to extend further into the space 106 to facilitate engagement of the multipoint latch member 124 in a manner that will be described in greater detail below. While the engagement member 136 has a Z-shaped configuration in this implementation, it will be appreciated from the following discussion that the engagement member 136 can have any of a number of different shapes without departing from the spirit of the present invention.

As is also shown in FIG. 2, the multipoint receiving member 126 is also mounted to the inner surface 120 of the access panel 112. It will be appreciated though that the multipoint receiving member 126 can be mounted on any of a number of different locations, including the access panel 112 without departing from the spirit of the present invention. As shown, the receiving member 126 includes a back wall 144 that is positioned immediately adjacent the inner surface of the access panel 120. In this specific implementation, the receiving member 126 also includes two side walls 146 and a top wall 150 that generally extend perpendicular to the plane of the back wall 144 so as to extend outward from the inner surface 120 of the access panel 112. The top wall 150 of the receiving member 126 includes a plurality of spaced receiving openings 152, spaced along the length of the receiving member 126. Further, the receiving member 126 extends along substantially the entire width of the access panel 112 or, at least along a sizeable percentage of it, e.g., 80%. The receiving member 126 is also positioned adjacent an upper edge 154 of the access panel 112 so that the upper edge 154 of the access panel 112 can be secured to the inner surface of the front wall 110 adjacent the upper surface 154.

It will be appreciated that, while the receiving member 126 is defined in a generally rectangular shape, any of a number of different configurations of receiving members can be formed. Basically, the receiving member is providing the receiving openings 152 that engage with the multipoint latch assembly 124 in the manner that will be described in greater detail below at a plurality of different locations. A number of alternatives to the configuration of the receiving member 126 can be implemented without departing from the spirit of the present invention. For example, the receiving member 126 can include a plurality of discrete members that define receiving openings 154 as opposed to a single member.

Figure 3:
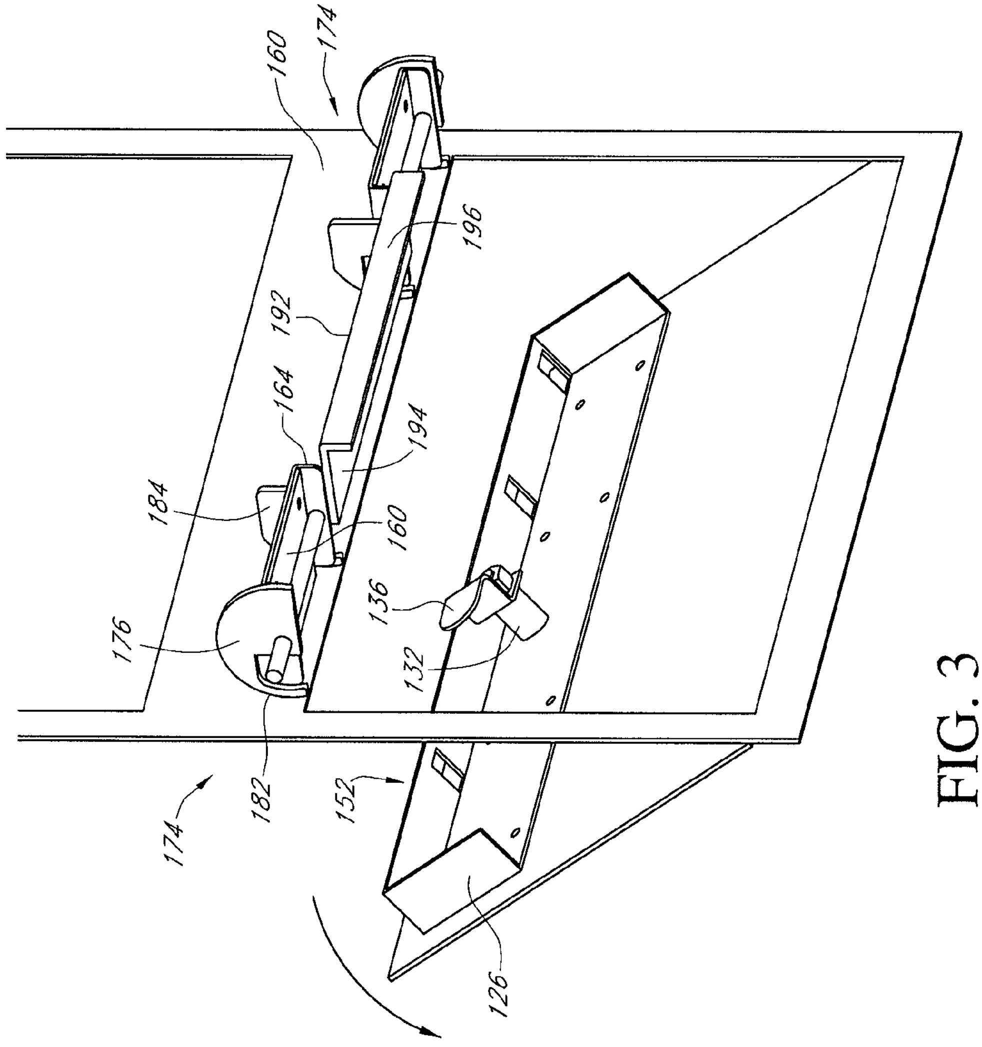
FIG. 3 is an interior view of the multipoint lock system of FIG. 1 where the door is in a partially opened configuration.

Referring now to FIGS. 2 and 3, the multipoint latching assembly 124 will be described in greater detail. As shown, the assembly 124 includes a shaft 156 that provides a pivot point for the components of the assembly 124. The assembly 124 is further mounted to the interior wall 160 of the front wall 110 or frame of the enclosure via two mounting platforms 162. The two mounting platforms 162 extend inward into the interior space 106 of the mailbox 100 and can be attached to the inner surface 160 of the front wall 110 in a variety of different manners including bolts, welds, etc. and the mounting platforms can comprise any of a number of other structures without departing from the spirit of the present invention. As shown in FIG. 3, two adaptor members 164 are positioned so as to sit on the upper surface 166 of the mounting platforms 164 and can be secured thereto via screws, welds, etc. The adaptor members 164 have a generally U-shaped configuration that has two legs that extend perpendicularly outward, e.g., downward in this implementation, from the plane of the mounting platforms 162. While the adaptor members 164 are shown in this implementation to be U-shaped, the exact configuration can vary without departing from the scope of the present invention. The two legs define openings 172 that receive the shaft 156 in the manner shown in FIG. 3. The manner in which the assembly 124 couples to the access panel 112 can comprise any of a number of manners without departing from the present invention.

As is also shown in FIGS. 2 and 3, a plurality of capture members 174 are also mounted on the shaft 156 so as to rotate as the shaft 156 rotates. As shown, there are actually two configurations of capture members 174 including two outer capture members 176 that are located on the outer ends of the shaft 156. The outer capture members 176 include a generally hemispheric-shaped body 180 with a hook 182 that is adapted to engage with the receiving openings 152 in the receiving member 126 in a manner that will be described in greater detail below. It will, of course, be appreciated that the shape and configuration of the outer capture members 176 can vary without departing from the spirit of the present invention.

As shown, the multipoint latch assembly 124 further includes two inner capture members 184 that mount to the shaft 156 via the openings 186 in the inner capture members 190 in a manner that also permits the inner capture members 184 to rotate coincident with the rotation of the shaft 156. The inner capture members 184 also define hooks 190 that engage with the receiving openings 152 in the receiving member 126 in a manner that will be described in greater detail below.

As is also shown in FIGS. 2 and 3, the inner capture members 184 are interconnected together via an engagement member 192. While the engagement member 192 interconnects the inner capture members 184, it will be appreciated that they can be independent without departing from the spirit of the present invention. The engagement member 192 is generally elongate and extends along the shaft 156 so as to be mounted rearwardly of the shaft 156 when the shaft 156 is rotated so that the capture members 192 are vertical. The engagement member 192 is preferably sized and configured so as induce rotation of the shaft 156 in a clockwise direction when the assembly is oriented in the manner shown in FIGS. 2 and 3. In this way, the engagement member 192 biases the shaft 156 to rotate due to the force of gravity in such a manner that the hooks 182 are extracted from the receiving openings 152 in a manner that will be described in greater detail below.

The exact shape and configuration of the engaging member 192 can vary provided that the engagement member 192 has sufficient mass to induce the shaft 156 and the attached capture members 174 to rotate in the counterclockwise direction. Further, as will be described in greater detail below, an undersurface 194 of the engagement member 192 is sized and positioned so as to engage with the outer end of the cylindrical lock engagement member 136 to allow the user to rotate the shaft 156 in a counterclockwise direction thereby inducing the hooks 182 to be positioned within the receiving openings 152 in the manner that will be described in greater detail below. As is also shown in FIGS. 2 and 3, a flange 196 is formed so as to extend generally perpendicularly downward from the bottom surface 194 of the shaft engagement member 192. The flange 196 is optional but does provide additional mass located distally from the rotational axis of the shaft 156 which further biases the engagement member 192 and shaft 156 into the open position.

Figure 4:
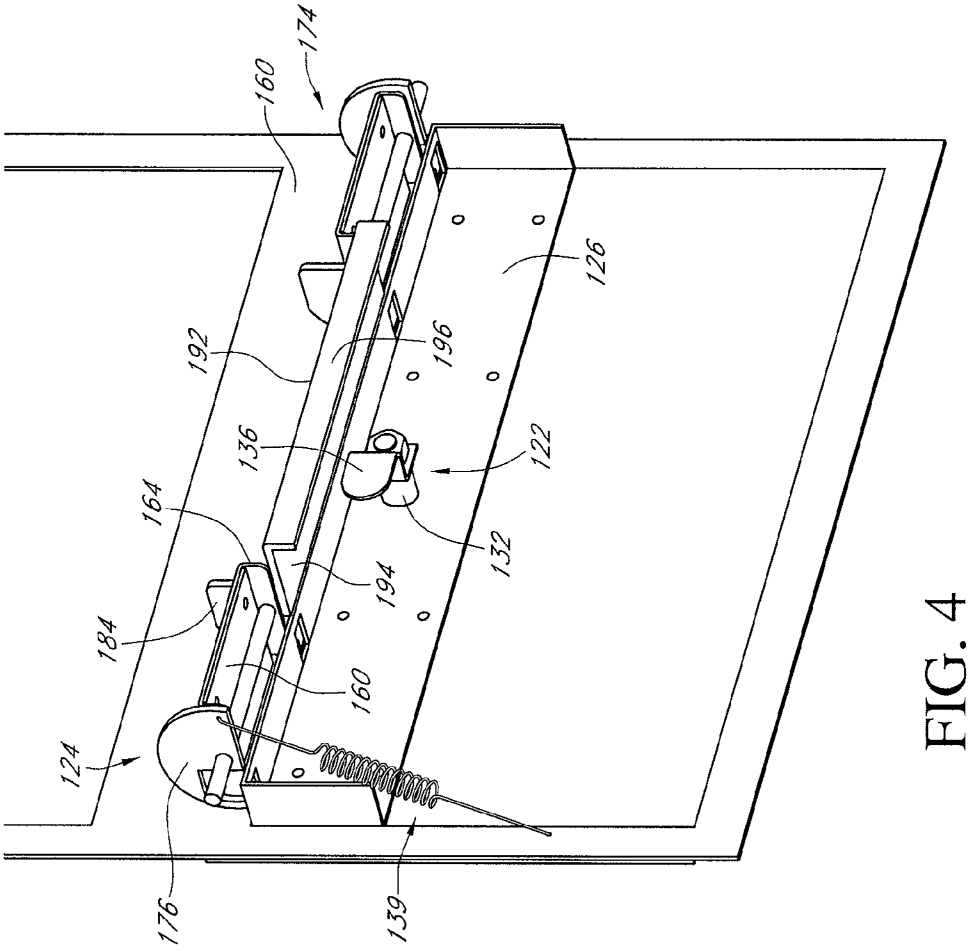
FIG. 4 is an inside view of the multipoint lock system of FIG. 1 wherein the door is in a closed but unlocked orientation.

As is also shown in FIG. 4, an optional spring 139 can be added so as to interconnect the multipoint latching member 126 and an inner wall 110 of the enclosure. The spring 139 is preferably placed so as to provide additional biasing of the multipoint latching member 126 into the open or unlatched position. In configurations of the multipoint locking assembly described herein which are not mounted so that the multipoint latch member is gravitationally biased into an unlatched position, e.g., mounted on a vertical surface, the latch member can be spring biased to achieve the advantages discussed herein without departing from the spirit of the present invention.

The operation of the multipoint locking system 102 will now be described in conjunction with FIGS. 3-5. As shown in FIG. 3, the access panel 112 can be opened by rotating the panel 112 downward in the counterclockwise direction shown in FIG. 3. Alternatively, the user can close the panel 112 so that the inner surface 120 is positioned proximate to the front wall 110 in the manner shown in FIG. 4. It will be appreciated that in order to close the access panel into the configuration shown in FIG. 4, the cylindrical lock assembly 122 has to be in an unlocked orientation. In the unlocked position, the rotational position of the cylindrical lock member 132 is such that the engagement member 136 is positioned in a generally horizontal position in the manner shown in FIG. 4. In this orientation the engagement member 136 is not interposed between the panel 112 and the front wall 110 of the mailbox 100 thereby allowing the access panel 112 to open and close.

When the panel 112 is in the position shown in FIG. 4, the user can then insert a key other tool device into the front face 130 (FIG. 1) of the cylindrical lock assembly 122 to induce the cylindrical lock member 132 to rotate in a clockwise direction in the manner shown in FIG. 4. Preferably, the engagement member 136 of the cylindrical lock assembly 122 is sized so as to engage with the undersurface 196 of the engagement member 192 that is attached to the shaft 156. This results in an upward force being urged by the engagement member 136 against the bottom surface 196 of the horizontal engagement member 192 such that the shaft 156 is rotated in a counterclockwise position.

Figure 5:
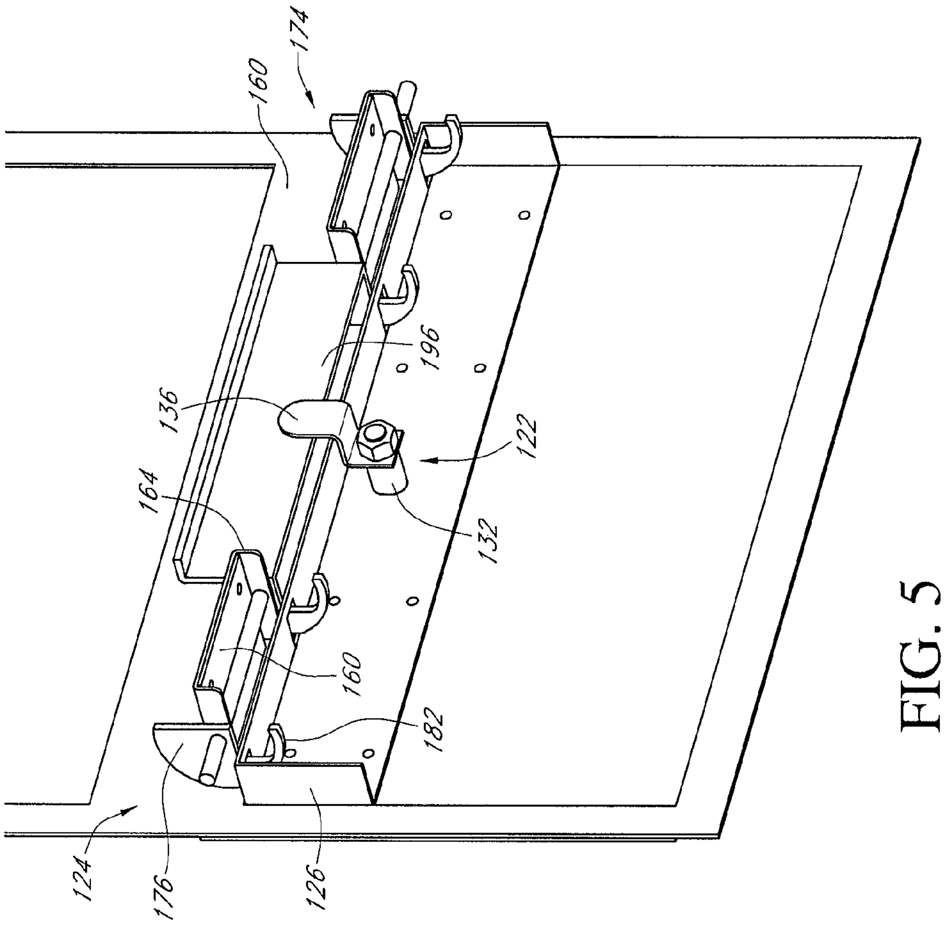
FIG. 5 is an inside view of the enclosure and lock assembly of FIG. 1 wherein the door is in a closed and locked position.

As is shown in FIG. 5, the shaft 156 is preferably rotated so that the capture members 194 engage with the receiving openings 152 so as to secure the multipoint latch assembly to the multipoint receiving member 126 in the manner shown in FIG. 5. More specifically, the rotation of the engagement member 136 as a result of the rotation of the cylindrical lock member 132, results in the outer end 142 of the engagement member 136 contacting the bottom surface 194 causing the horizontal engagement member 192 to rotate into a vertical position and be retained there by the engagement member 136 in the manner shown in FIG. 5. The hook members 182 on the outer capture members 176 as well as the hook members 190 on the inner capture members 184 are preferably sized and positioned relative to the horizontal engagement member 192 so that they extend into the engagement openings 152 of the receiving member 126. Preferably, the hooks extend inwardly into the space 106 of the mailbox 100 so that the tip of the hooks extend beyond the inner edge of the top wall 150 of the multipoint receiving member 126 to ensure a more secure attachment.

In the locked configuration shown in FIG. 5, the panel 112 is secured to the front wall 100 at multiple points spaced along the width of the panel 112 thereby providing enhanced security to the interior of the mailbox 100. However, disengaging the capture members 174 from the receiving openings 152 is greatly simplified in this embodiment. Specifically, the user simply has to rotate the cylindrical lock member 122 so that the engagement member 136 is positioned horizontally in the manner shown in FIG. 4. This allows the engagement member to rotate through a generally horizontal position shown in FIG. 4. This resulting rotation of the engagement member 192 and shaft 156 further results in the capture member 174 rotating so as to be removed from the receiving openings 152. Thus, the biasing either by the force of gravity or the spring or some combination thereof results in the disengagement of the capture members 174 from the receiving openings 152 once the cylindrical lock mechanism has been manipulated into the unlocked configuration of FIGS. 3 and 4. As a result of this bias, the lock mechanism is simple to operate and is less prone to jam.

It will be appreciated from the foregoing description, that there can be very many modifications to the configurations of the component without departing from the spirit of the present invention. Indeed, although the foregoing description has shown, described and pointed out the fundamental novel features of the present teachings, it will be understood that various omissions, substitutions and change of the form of the detail of the apparatus as illustrated, as well as the uses thereof, may be made by those skilled in the art without departing from the scope of the present teachings. Consequently, the scope of the present teachings should not be limited to the foregoing discussion but should be defined by the appended claims.

What is claimed is:

1. A mailbox assembly comprising:

a plurality of walls that define an at least partially enclosed space;

an access panel attached to at least one of the plurality of walls, wherein the access panel is pivotally attached to the at least one of the plurality of walls so that the access panel can be moved between an open orientation, wherein access to the at least partially enclosed space is provided through an opening having a first width in the at least one of the plurality of walls, and a closed orientation wherein the access panel covers the opening thereby inhibiting access to the at least partially enclosed space;

a user actuated lock mechanism engaged with the access panel, wherein the user actuated lock mechanism includes a first member extending through the access panel into the at least partially enclosed space wherein the user actuated lock mechanism is movable by a user between a locked and unlocked configuration;

a multi-point latch mechanism positioned in the at least partially enclosed space, wherein the multi-point latch mechanism is rotatable and has plurality of latch members that are rotationally moved between a latched and an unlatched orientation and wherein the multi-point latch mechanism is biased into the unlatched position and wherein user manipulation of the user-actuated lock mechanism results in the user actuated lock mechanism engaging with the multi-point latch mechanism so as to induce the multi-point latch mechanism to move between the latched and unlatched orientation; and at least one receiving member that is coupled to the panel wherein the receiving member defines receiving openings that are spaced along the width of the opening wherein the openings receive the latch members of the multi-point latch mechanism when the multi-point latch mechanism is in the latched orientation to thereby secure the latch members in the openings and the panel in the closed orientation.

2. The mailbox assembly of claim 1, wherein the access panel has a top and bottom edge and is pivotally connected to the at least one of the plurality of walls along the bottom edge so as to be gravitationally biased in the open orientation.

3. The mailbox assembly of claim 1, wherein the first member of the user-actuated lock mechanism comprises a cylindrical member and wherein the user-actuated lock mechanism further includes a radially extending member coupled to the cylindrical member so as to extend radially outward therefrom in the at least partially enclosed space so that the radially extending member engages with the multi-point latch mechanism to urge the multi-point latch mechanism from the unlatched orientation to the latched orientation.

4. The mailbox assembly of claim 1, wherein the multi-point latch mechanism is gravitationally biased into the unlatched orientation and includes a rotatable shaft with the plurality of latch members being attached thereto so as to rotate with the shaft.

5. The mailbox assembly of claim 4, wherein the plurality of latch members comprise four latch members spaced substantially an equal distance along the length of the rotatable shaft.

6. The mailbox assembly of claim 4, further comprising an engagement member that is mounted to the shaft so as to be rotatable therewith, wherein the engagement member is sized and positioned on the shaft so that gravity induces the shaft to rotate into the unlatched orientation.

7. The mailbox assembly of claim 1, further comprising a spring that biases the multipoint latch mechanism into the unlatched orientation.

8. The mailbox assembly of claim 6, wherein the user actuated lock mechanism engages with the engagement member on the rotatable shaft so as to induce the shaft to rotate between the unlocked configuration and the locked configuration.

9. The mailbox assembly of claim 1, wherein the multi-point latch member is mounted to an interior surface of one of the walls and the at least one receiving member is mounted to the access panel.

10. The mailbox assembly of claim 9, wherein the at least one receiving member comprises a single member that has a horizontally extending surface that defines the plurality of openings.

11. A latch assembly for a storage enclosure comprising a plurality of walls one of which having an opening that defines an at least partially enclosed space, the latch assembly comprising:

an access panel that pivotally mounts to a first one of plurality of walls adjacent the opening formed therein, so that the access panel can be moved between an open orientation, wherein access to the at least partially enclosed space is provided through the opening, and a closed orientation wherein the access panel covers the opening thereby inhibiting access to the at least partially enclosed space;

a user actuated lock mechanism that mounts to the access panel so as to extend through the access panel, wherein the user actuated lock mechanism includes a first member extending through the access panel into the at least partially enclosed space when mounted to the access panel and wherein the user actuated lock mechanism is movable by a user between a locked and unlocked configuration;

a multi-point latch mechanism that mounts to the wall with the opening so as to be positioned in the at least partially enclosed space, wherein the multi-point latch mechanism is rotatable and has a plurality of latch members that are rotationally moved between a latched and an unlatched orientation and wherein the multi-point latch mechanism is biased into the unlatched orientation and wherein user manipulation of the user-actuated lock mechanism results in the user actuated lock mechanism engaging with the multi-point latch mechanism so as to induce the multi-point latch mechanism to move between the latched and unlatched orientation; and at least one receiving member that mounts to the panel wherein the receiving member defines receiving openings that are spaced along the width of the opening wherein the openings receive the latch members of the multi-point latch mechanism when the multi-point latch mechanism is in the latched orientation to thereby secure the latch members in the openings and the panel in the closed orientation.

12. The latch assembly of claim 11, wherein the first member of the user-actuated lock mechanism comprises a cylindrical member and wherein the user-actuated lock mechanism further includes a radially extending member coupled to the cylindrical member so as to extend radially outward therefrom in the at least partially enclosed space so that the radially extending member engages with the multi-point latch mechanism to urge the multi-point latch mechanism from the unlatched orientation to the latched orientation.

13. The latch assembly of claim 12, wherein the multi-point latch mechanism is gravitationally biased into the unlatched orientation includes a rotatable shaft with the plurality of latch members being attached thereto so as to rotate with the shaft.

14. The latch assembly of claim 13, wherein the plurality of latch members comprise four latch members spaced substantially an equal distance along the length of the rotatable shaft.

15. The latch assembly of claim 14, further comprising an engagement member that is mounted to the shaft so as to be rotatable therewith, wherein the engagement member is sized and positioned on the shaft so that gravity induces the shaft to rotate into the unlatched orientation.

16. The latch assembly of claim 15, wherein the user actuated lock mechanism engages with the engagement member on the rotatable shaft so as to induce the shaft to rotate between the unlocked configuration and the locked configuration.

17. The latch assembly of claim 11, wherein the at least one receiving member comprises a single member that has a horizontally extending surface that defines the plurality of openings.

* * * * *